H. G. BERENTSEN.
ELECTRIC LOCOMOTIVE.
APPLICATION FILED JAN. 10, 1910.
981,741.
Patented Jan. 17, 1911.
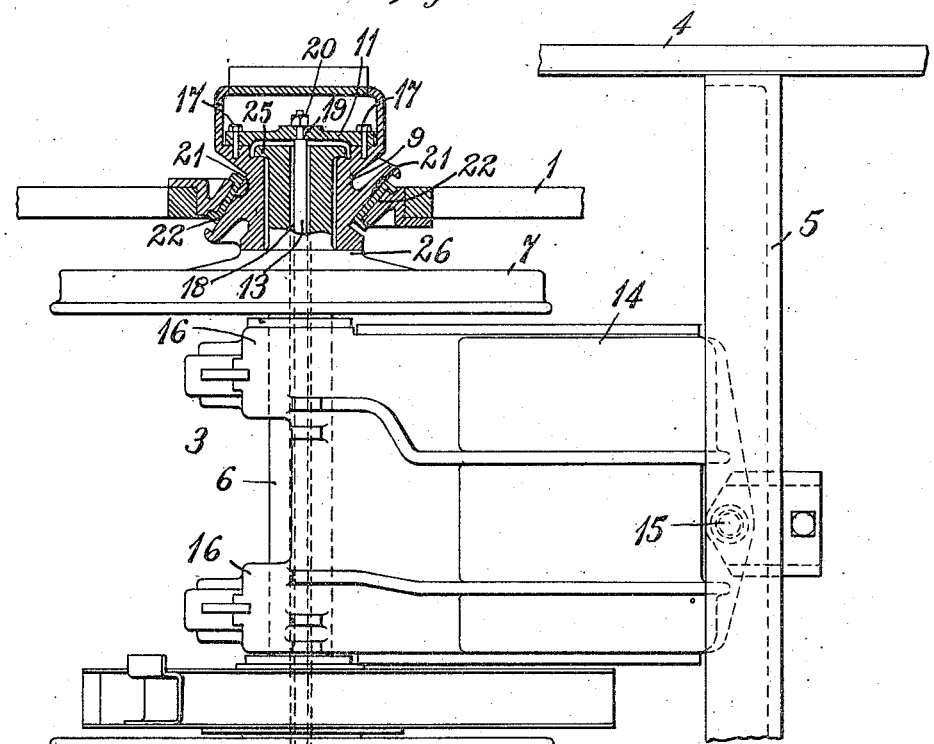
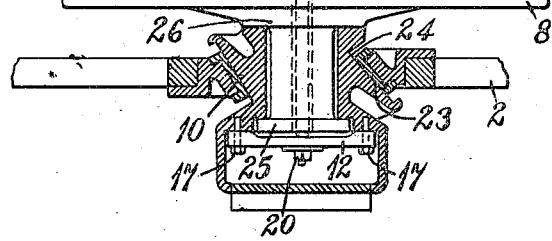
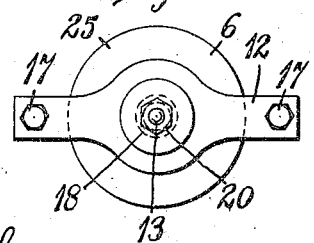
WITNESSES:
INVENTOR
BY
ATTORNEY

UNITED STATES PATENT OFFICE.

HANS G. BERENTSEN, OF PITTSBURG, PENNSYLVANIA, ASSIGNOR TO WESTINGHOUSE ELECTRIC AND MANUFACTURING COMPANY, A CORPORATION OF PENNSYLVANIA.

ELECTRIC LOCOMOTIVE.

981,741. Specification of Letters Patent. Patented Jan. 17, 1911.

Application filed January 10, 1910. Serial No. 537,244.

*To all whom it may concern:*

Be it known that I, HANS G. BERENTSEN, a citizen of the United States, and a resident of Pittsburg, in the county of Allegheny and State of Pennsylvania, have invented a new and useful Improvement in Electric Locomotives, of which the following is a specification.

My invention relates to electric locomotives and other railway vehicles and particularly to such vehicles as are provided with motor-operated pony trucks having limited swinging adjustments.

The object of my invention is to provide simple and effective means for resisting the tendency for the journal boxes of a locomotive, equipped as above indicated, to spread apart or to approach each other by reason of the fact that the driving effort exerted by a swinging pony truck is applied to the side frames at an angle to the direction of movement of the locomotive.

Pony trucks have heretofore been provided with such bearings in the side frames of the locomotive as to permit a limited swinging adjustment about a point in the central plane of the vehicle and at some distance from the center line of the axle. When trucks of this character are used merely for guiding purposes there is only a small tendency for the journal boxes to either spread apart or approach each other, but when trucks of this character are provided with driving motors, there are obviously material components of the forces exerted upon the side frames which tend to either separate the journal boxes or draw them together, depending on the position of the truck and the direction of movement of the locomotive. If these forces, which perform no useful function, are not overcome, they create such an end thrust between the bearing boxes and either the axle collars or wheel hubs as to produce high temperatures and excessive wear.

According to my present invention, I bore a hole directly through the center of the axle to receive a tie-rod the ends of which are rigidly secured to the journal boxes, the arrangement being such that the tie-rod is subject to strains in tension or compression and only useful driving forces are transmitted from the journal boxes to the side frames. This arrangement commends itself, not only on account of the simplicity and lightness of the tie-rod structure, but also on account of the very small amount of labor which is necessarily expended in adapting it to standard structures. When the axles are large and are called upon to sustain great weights, it is desirable to bore holes through their centers in order to remove the relatively poor metal commonly known as the "pipe" which is produced when they are forged.

Figure 1 of the accompanying drawings is a plan view, partially in section, of a pony truck of a locomotive which embodies my invention, a portion of the side frames of the locomotive being indicated for the sake of clearness of illustration. Fig. 2 is a sectional elevation through one of the journal boxes and Fig. 3 is an end view of the axle showing a portion of the cross tie structure of my invention.

Referring to the drawings, the structure here shown comprises locomotive side frames 1 and 2, a pony truck 3 and a body 4 (only a part of which is shown) having a cross beam or transom 5. The pony truck 3 comprises an axle 6 provided with driving wheels 7 and 8, journal boxes 9 and 10, which are supported in the side frames 1 and 2, as hereinafter pointed out, end brackets 11 and 12, a tie-rod 13 and an electric driving motor 14 which constitutes a radius frame for the truck and is pivotally connected to the transom 5 at a point 15. The motor 14 is provided with axle bearings 16 which surround the axle between the wheels 7 and 8 and adjacent to them, without interfering with the normal rotation of the axle.

The brackets 11 and 12 are secured to the ends of the journal boxes 9 and 10 by means of bolts 17 and extend across the ends of the axle 6. The tie-rod 13 extends through a hole 18 in the axle and is firmly secured at its ends to the brackets 11 and 12, the ends of the rod being reduced in size to extend through holes 19 in the brackets and being screw-threaded to receive clamping nuts 20. The hole 18 in the axle is considerably larger than the tie-rod in order to prevent contact between the two parts, since one rotates while the other is stationary.

Since the motor frame is pivotally supported at the point 15, from transom 5, the pony truck rotates, as a whole, about this point as an axis, provided the relation between the bearing boxes and the side frames will permit it. A limited swinging adjustment of this kind is provided for, as shown in the drawings, by making the bearing surfaces 21 and 22 and 23 and 24 between the boxes and the side frames substantially tangent to a circumference the center of which coincides with point 15.

The propelling forces which are exerted between the journal boxes and the side frame are obviously transmitted through these engaging surfaces and, since these surfaces are oblique to the plane of the side frame and to the direction of movement of the locomotive, there is a component which performs no useful work and which tends to either draw the journal boxes together or to force them apart, according to the direction in which the driving motor is operated. The tie-rod 13 is provided in order to overcome these components and to prevent the journal boxes from being forced against the axle collars 25, on the one hand, or the wheel hubs 26 on the other.

The end brackets 11 and 12 to which the tie-rod is secured, may be replaced by any other suitable structures which are secured to, or form parts of, the journal boxes. In order to maintain a concentric relation between the axle and the rod, it may be found of advantage to adjustably support the brackets on the journal boxes or to adjustably attach the rods to the brackets. The tie-rod is, however, preferably placed near the top of the hole in the axle and permitted to approach a concentric relation as the journal boxes wear.

It is evident that my invention is not restricted to electrically propelled pony trucks, and structural modifications may obviously be effected within the spirit and scope of my invention as defined in the appended claims.

I claim as my invention:

1. In a vehicle, the combination with a hollow wheel axle, journal boxes therefor and a frame partially supported thereon, of a tie rod extending through the axle and secured to the journal boxes at its ends.

2. In a vehicle, the combination with a pony truck having a hollow axle, and parallel side frames supported on said truck and permitting a swinging adjustment thereof, of a tie rod extending through the hollow axle and fastened to the journal boxes to counteract the forces which tend to move said journal boxes toward and away from each other.

3. In a vehicle, the combination with a pony truck comprising a wheel axle and journal boxes therefor, of parallel side frames supported on the journal boxes of the truck and permitting a swiveling adjustment thereof, and a tie-rod which extends through the axle and is secured to the journal boxes.

4. In a railway vehicle, the combination with a pony truck comprising a wheel axle, journal boxes and a driving motor therefor, of parallel side frames mounted on the journal boxes and permitting a limited swinging adjustment of the truck, brackets secured to the journal boxes and extending across the ends of the axle, and a tie-rod which extends loosely through a hole in the axle and is secured to the brackets.

5. In a railway vehicle, the combination with a pony truck comprising a wheel axle, journal boxes and a driving motor therefor, of parallel side frames mounted on the journal boxes and permitting a limited swinging adjustment of the truck, brackets secured to the journal boxes and extending across the ends of the axle, and a tie-rod which extends loosely through a hole in the axle and is secured to the brackets, said motor being pivotally secured to the vehicle body and constituting a radius frame for the truck.

In testimony whereof, I have hereunto subscribed my name this 6th day of Jan., 1910.

HANS G. BERENTSEN.

Witnesses:
ALVA G. CORRAO,
B. B. HINES.